United States Patent [19]

Birch

[11] Patent Number: 5,451,615
[45] Date of Patent: Sep. 19, 1995

[54] PROCESS FOR PREPARING POLYURETHANE FOAM IN THE PRESENCE OF A HYDROCARBON BLOWING AGENT

[75] Inventor: Adrian J. Birch, Horgen, Switzerland

[73] Assignee: The Dow Chemical Company, Midland, Mich.

[21] Appl. No.: 326,430

[22] Filed: Oct. 20, 1994

[51] Int. Cl.$^6$ ............................................... C08J 9/00
[52] U.S. Cl. ................... 521/132; 521/130; 521/170; 521/174; 521/172
[58] Field of Search ............... 521/130, 132, 172, 174, 521/170

[56] References Cited

U.S. PATENT DOCUMENTS

| | | |
|---|---|---|
| 2,846,408 | 8/1958 | Brochhagen et al. . |
| 3,165,483 | 1/1965 | Gemeinhardt et al. . |
| 3,297,597 | 1/1967 | Edwards et al. . |
| 3,882,684 | 5/1975 | Meyer et al. . |
| 3,933,705 | 1/1976 | Olstowski . |
| 4,137,265 | 1/1979 | Austin . |
| 4,263,412 | 4/1981 | Pauls . |
| 4,383,102 | 5/1983 | McDaniel et al. . |
| 4,394,491 | 7/1983 | Hoffman . |
| 4,475,847 | 10/1984 | Cornely et al. . |
| 4,704,410 | 11/1987 | Booth et al. . |
| 4,704,411 | 11/1987 | Gansow et al. . |
| 4,839,397 | 6/1989 | Lohmar et al. . |
| 4,945,119 | 7/1990 | Smits et al. . |
| 5,001,164 | 3/1991 | Smits et al. . |
| 5,096,933 | 5/1992 | Volkert . |
| 5,182,309 | 1/1993 | Hützen . |
| 5,286,759 | 2/1994 | Gruenbauer et al. . |

FOREIGN PATENT DOCUMENTS 3433928 3/1986 Germany .

*Primary Examiner*—Morton Foelak

[57] ABSTRACT

Disclosed is a process for preparing a rigid, hydrocarbon blown, polyurethane foam by reacting a polyisocyanate with a polyol composition comprising a fatty oil. The fatty oil has a fatty acid content, especially a hydroxyl-substituted fatty acid, which enhances the miscibility of the hydrocarbon blowing agent. A preferred fatty oil is castor oil comprising as principle constituent the hydroxyl-substituted fatty acid, ricinoleic acid. Enhanced storage stability of a polyol composition containing hydrocarbon blowing agent in amounts required for production of low density foam is observed.

15 Claims, No Drawings

PROCESS FOR PREPARING POLYURETHANE FOAM IN THE PRESENCE OF A HYDROCARBON BLOWING AGENT

BACKGROUND OF THE INVENTION

This invention relates to a process for preparing a rigid, hydrocarbon blown, polyurethane foam by reacting a polyisocyanate with a polyol composition comprising a fatty oil, notably castor oil.

A recent trend in the manufacture of polyurethane foam, especially rigid polyurethane foam, is the use of hydrocarbon blowing agents as substitute or replacement for the traditionally employed blowing agents including trichlorofluoromethane. Such trend has been motivated by the desire to eliminate the use of certain fully halogenated alkanes in an effort to protect the environment including the ozone content of the atmosphere. The general use of hydrocarbons as a blowing agent for polyurethane foam is widely reported in the literature. For example, U.S. Pat. No. 5,096,933 discloses the use of cyclopentane, cyclohexane or mixtures thereof. U.S. Pat. No. 5,182,309 discloses the use of pentane. U.S. Pat. No. 5,001,164 discloses the use of pentane in combination with trichloroethane. U.S. Pat. No. 5,286,759 discloses combinations of hydrocarbons containing at least 4 carbon atoms with perfluoroalkanes as a blowing agent for polyurethane foam manufacture. U.S. Pat. No. 4,263,412 discloses the preparation of polyurethane foam in the presence of butane. Of the mentioned hydrocarbons, use of cyclopentane and pentane is presently favored due to availability and general benefit to the physical properties of the foam.

However, to prepare polyurethane foam which exhibits attractive physical properties, advantageously all reactants should be readily miscible with one and another and/or high efficiency mixing procedures be employed to ensure even distribution of all starting materials. In the presence of poor miscibility or poor mixing, the resulting foam may exhibit inferior, unattractive, physical properties. Hydrocarbon blowing agents, especially when used in significant amounts as might be required to produce a low density foam, are generally not noted for having attractive miscibility with the majority of polyester or polyether polyols commonly used to prepare polyurethane foam. Frequently separation results leading to poor mixing and/or poor foam quality.

In the art when problems of miscibility are encountered, using the traditional type of blowing agents, frequently they can be resolved by varying the amount of cell stabilizing agent or surfactant present in the foaming process. In many instances, the problem has been resolved by use of a surfactant in an amount of from about 0.1 to about 2 parts per 100 parts of polyol. Use of greater amounts of surfactants, normally a mineral oil of the polysiloxane type, can lead to a significant decline in the physical properties of the resulting foam. For closed-cell rigid polyurethane foam, this can be a reduction of compressive strength, a loss of thermal insulation potential as a consequence of an acquired open-cell content, or poor mold filling (flow) characteristics. When preparing low density polyurethane foam in the presence of a hydrocarbon blowing agent with elevated loadings of the conventional surfactants, the poor miscibility problem is not satisfactorily resolved. Accordingly it would be desirable to provide for an alternative foaming process permitting the manufacture of polyurethane foam, especially low density foam, in the presence of a hydrocarbon blowing agent which does not suffer from the above mentioned deficiencies.

For this purpose, the use of hydroxyl-containing fatty oils has been investigated.

SUMMARY OF THE INVENTION

In a first aspect, this invention relates to a process for preparing a closed-celled polyurethane foam which comprises reacting, in the presence of a hydrocarbon blowing agent, a polyisocyanate with a polyol composition wherein the polyol composition comprises:

i) a polyether or polyester polyol having a hydroxyl number value of from about 100 to about 1200; and includes ii) from about 5 to about 25 parts, per 100 parts by total weight of the polyol composition, of a fatty oil having a hydroxyl number of from about 100 to about 200.

In a second aspect, this invention relates to a closed-celled polyurethane foam obtained according to the above mentioned process.

In a third aspect, this invention relates to a blend or polyurethane foam precursor, suitable for use in the inventive process, which comprises the above mentioned polyol composition containing a fatty oil and further a blowing agent present in an amount of from about 1 to about 20 parts per 100 parts by total weight of the composition and selected from the group consisting of butane, n-pentane, i-pentane, hexane, cyclopentane, methylcyclopentane, cyclohexane, methylcyclohexane, isomers thereof, or mixtures of two or more thereof.

Surprisingly, it has been found that use of a naturally occurring, hydroxyl-containing fatty oil in the given amount, enhances the miscibility of hydrocarbon blowing agent and minimizes the susceptibility to separation of the formulation. The presence of the fatty oil allows for an increased loading of the hydrocarbon blowing agent thereby permitting the manufacture of foam having a lower density while retaining overall attractive physical properties.

DETAILED DESCRIPTION OF THE PREFERRED EMBODIMENTS

The present invention relates to a process for preparing a rigid, closed-celled polyurethane foam by reacting, in the presence of a hydrocarbon blowing agent, a polyisocyanate with a polyol composition comprising a certain compatibilizing agent. Advantageously, the resulting foam is of a low free rise density of from about 10 to about 50, preferably from about 15 to about 40, and more preferably from about 15 to about 35 kg/m$^3$.

The polyol composition, sometimes referred to as a polyurethane precursor composition when mixed with the hydrocarbon blowing agent, comprises: (a) an isocyanate-reactive component having a hydroxyl number value of from about 100 to about 1200, preferably from about 100 to about 800, more preferably from about 200 to about 800, and yet more preferably from about 200 to about 600 and preferably being a polyester or polyether polyol; and (b) a compatibilizing agent. The compatibilizing agent allows for attractive miscibility of the hydrocarbon blowing agent with the polyol and is present in an amount of from about 5 to about 25, preferably from about 6, more preferably from about 7, and preferably up to about 18, more preferably up to about 15 parts by total weight of the polyol composition including polyol and compatibilizing agent. The compatibilizing agent is a fatty oil having a hydroxyl number value of from about 100 to about 200, preferably from about 130 to about 180, and more preferably from about 140 to about 180. The presence of the compatibilizing agent in other amounts may not provide for the desired miscibility of hydrocarbon blowing agent with the polyol composition, or may lead to the production of a polyurethane foam with unattractive properties.

The fatty oil advantageously comprises a fatty acid, and especially a hydroxyl-substituted fatty acid. Detailed descriptions of fatty oils and their fatty acid contents are well known. See, for example, the entry "Fats and Fatty Oils" in Ullmann's *Encyclopedia of Industrial Chemistry*, ISBN 0-89573-160-6, or alternatively Kirk-Othmer *Encyclopedia of Chemical Technology*, ISBN 0-471-02062-1. For the present invention, suitable fatty oils are those which contain as the fatty acid constituent, ricinoleic acid, dihydroxystrearic acid, palmatic acid, stearic acid, oleic acid, linoleic acid, linolenic acid, eicosanoic acid, or mixtures of two or more thereof. Especially preferred is a hydroxyl-substituted fatty acid, exemplary of such is ricinoleic acid which exhibits the peculiarity of excellent miscibility with polar substances, such as alcohols including polyols, and limited miscibility with nonpolar substances such as hydrocarbons. A convenient and readily available natural fatty oil source comprising a hydroxyl-substituted fatty acid is castor oil which is understood to comprise on average about 90 wt % ricinoleic acid and about 4 wt % of linoleic acid, with the balance to 100% being made up from minor amounts of dihydroxystrearic acid, palmatic acid, stearic acid, oleic acid, linolenic acid and eicosanoic acid. Castor oil, essentially independent of source, has a hydroxyl number of from about 160 to about 168.

Ester adducts of the above fatty acids, while possessing attractive surface active properties, are not contemplated for use in the present invention unless they meet the hydroxyl content requirement. The presence of the hydroxyl content is desired to permit reaction with the polyisocyanate thereby incorporating, to the advantage of the polymer physical properties, the fatty acid molecule into the polyurethane polymer.

Suitable polyols include those which are conventionally used in the preparation of rigid polyurethane foam and having a hydroxyl number value within the above mentioned range. Additionally, such polyols will generally contain from about 2 to about 8, preferably from about 3 to about 8, and more preferably from about 3 to about 6 hydroxyl groups per molecule. Examples of suitable, and preferred, polyols are polyether polyols as described more fully in U.S. Pat. No. 4,394,491. Exemplary of such polyether polyols include those commercially available under the trademark, VORANOL and include VORANOL 202, VORANOL 360, VORANOL 370, VORANOL 446, VORANOL 490, VORANOL 575, VORANOL 640, VORANOL 800, VORANOL CP1000, VORANOL CP260, VORANOL CP450, and VORANOL RN482, all available from The Dow Chemical Company. Other preferred polyols include alkylene oxide derivatives of Mannich condensate as taught in, for example, U.S. Pat. Nos. 3,297,597; 4,137,265 and 4,383,102; and amino-alkylpiperazine-initiated polyether polyols as described in U.S. Pat. Nos. 4,704,410 and 4,704,411.

As mentioned, the polyurethane foaming process of this invention requires the presence of a hydrocarbon blowing agent which advantageously comprises a $C_{4-8}$ aliphatic or cycloaliphatic hydrocarbon being an alkane, alkene or alkyne. Such hydrocarbons are selected as blowing agent because they have a boiling point lower than the reaction exotherm, generally more than 120° C., and usually of from about 150° C. to about 200° C., encountered when preparing a polyurethane foam. Suitable hydrocarbons include those having a boiling point of less than 120° C., preferably less than 100° C., and more preferably less than 50° C. such as, for example butane, n-pentane, i-pentane, cyclopentane, methylcyclopentane, hexane, cyclohexane methylcyclohexane, isomers thereof, or mixtures of two or more thereof. Preferred hydrocarbons, due to their ability to confer attractive thermal insulation properties to the polyurethane foam, are n-pentane, i-pentane and cyclopentane. Especially preferred is a mixture of isomers n-pentane and i-pentane wherein the ratio of n-pentane to i-pentane is from about 5:95 to about 50:50, preferably from about 10:90 to about 35:65. This fraction of i-pentane is found to be advantageous for optimum flow properties when preparing a polyurethane foam and for conferring attractive thermal insulation properties to the resulting foam. Typically the hydrocarbon will be present in an amount of from about 1 to about 20, preferably from about 5 to about 20, and more preferably from about 7 to about 18 parts per 100 parts by total weight of the composition comprising polyol and compatibilizing agent.

In addition to the hydrocarbon blowing agent, optionally a supplemental blowing means can be provide by the presence of water. Water reacts with polyisocyanate leading to the production of carbon dioxide which is able to confer a reduced density to the polyurethane polymer. When present, the amount of water advantageously is from about 0.5 to about 10, preferably from about 1.5 to about 8, and more preferably from about 2 to about 6 parts per 100 parts by weight of the polyol composition including the fatty oil. In a highly preferred embodiment of the invention, polyurethane foam is prepared in the presence of water and hydrocarbon blowing agent wherein, per 100 parts by weight of the polyol composition including the compatibilizing agent, the water is present in an amount of from about 2 to about 6 parts, and the hydrocarbon blowing agent being n-pentane, i-pentane, cyclopentane, or mixtures of at least two thereof is present in an amount of from about 1 to about 20 parts. In a lesser preferred embodiment, it is also possible to use conventional fluorocarbons or hydrogen-containing chlorofluorocarbons, as supplemental physical blowing agent, including difluorochloromethane, difluoroethane, difluorochloroethane, tetrafluoroethane dichlorotrifluoroethane and others such as those taught, for example, in U.S. Pat. No. 4,945,119.

Suitable polyisocyanates include aromatic, aliphatic and cycloaliphatic polyisocyanates and combinations thereof. A crude polyisocyanate may also be used in the practice of this invention, such as the crude toluene diisocyanate obtained by the phosgenation of a mixture of toluene diamines or the crude diphenylmethane diisocyanate obtained by the phosgenation of crude methylene diphenylamine. Preferred are aromatic polyisocyanates comprising a methylene diphenylisocyanate; polymethylene polyphenylisocyanate, or mixtures thereof. Suitable mixtures include those containing, based on total weight of polyisocyanate, from about 10 to about 50 wt % of methylene diphenylisocyanate; and from about 90 to about 50 wt % of polymethylene polyphenylisocyanate. For the purpose of providing cross linkages in the end polymer, advantageously such an aromatic polyisocyanate has an average isocyanate functionality of at least 2.3, preferably from about 2.5 to about 3.5, and more preferably from about 2.7 to about 3.1. Exemplary of commercially available aromatic polyisocyanates suitable for use in this invention include crude methylene diphenylisocyanate mixtures supplied by The Dow Chemical Company under the trademark VORANATE and designated as M220, M229, M269, M595 and M580.

The amount of polyisocyanate present when preparing the polyurethane foam is such to provide for an isocyanate reaction index of typically from about 60 to about 300, preferably from about 70, more preferably from about 80, and preferably up to about 200, more preferably up to about 160, and yet more preferably up to about 140. An isocyanate reaction index of 100 corresponds to one isocyanate group per isocyanate reactive hydrogen atom present including those from the polyol composition containing compatibilizing agent and, if present, any water.

Optionally other ingredients may be present when preparing the polyurethane foam. Among these other ingredients are catalysts, surfactants, colorants, antioxidants, reinforcing agents, fillers, antistatic agents and flame retardants. Suitable flame retardants include phosphorus containing substances such as tris(chloroalkyl)phosphate and trisalkylphosphates, for example triethylphosphate; and nitrogen containing substances such as melamine.

One or more catalysts for the reaction of the active hydrogen-containing compound with the polyisocyanate are advantageously present. Suitable catalysts include tertiary amine compounds and organometallic compounds. Exemplary tertiary amine catalysts include triethylenediamine, pentamethyldiethylenetriamine, N-ethylmorpholine, N-cocomorpholine, N-methylmorpholine, tetramethylethylenediamine, dimethylbenzylamine, 1-methyl-4-dimethylaminoethylpiperazine, 3-methoxy-N-dimethylpropylamine, diethylethanolamine, N,N-dimethyl-N',N'-dimethylisopropylpropylenediamine, N,N-diethyl-3-diethylaminopropylamine and the like. Exemplary organometallic catalysts include organomercury, organolead, organoferric and organotin catalysts, with organotin catalysts being preferred among these. Suitable tin catalysts include stannous chloride, tin salts of carboxylic acids such as dibutyltin di-2-ethyl hexanoate, as well as other organometallic compounds such as are disclosed in U.S. Pat. No. 2,846,408. A catalyst for the trimerization of polyisocyanates and formation of polyisocyanurate polymers, such as an alkali metal alkoxide, alkali metal carboxylate or quaternary amine compound, may also optionally be employed herein. When employed, the quantity of catalyst used is sufficient to increase the rate of polymerization reaction. Precise quantities must be determined experimentally, but generally will range from about 0.01 to about 3.0 parts by weight per 100 parts polyol depending on the type and activity of the catalyst.

It is generally highly preferred to employ a minor amount of a surfactant to stabilize the foaming reaction mixture until it cures. Such surfactants, distinguished from the naturally occurring fatty oil, are generally manufactured mineral oils including liquid or solid organosilicone surfactants. Other, less preferred surfactants, include polyethylene glycol ethers of long chain alcohols, tertiary amine or alkanolamine salts of long chain alkyl acid sulfate esters, alkyl sulfonate esters and alkyl arylsulfonic acids. Such surfactants are employed in amounts sufficient to stabilize the foaming reaction mixture against collapse and the formation of large, uneven cells. Typically, from about 0.1 to about 3 parts of the surfactant per 100 parts by weight polyol are sufficient for this purpose.

In making a polyurethane foamy the polyol(s), polyisocyanate and other components are contacted, thoroughly mixed and permitted to expand and cure into a cellular polymer. The particular mixing apparatus is not critical, and various types of mixing head and spray apparatus are conveniently used. It is often convenient, but not necessary, to preblend certain of the raw materials prior to reacting the polyisocyanate and active hydrogen-containing components. For example, it is often useful to blend the polyol(s), blowing agent, surfactants, catalysts and other components except for polyisocyanates, and then contact this mixture with the polyisocyanate. Alternatively, all components can be introduced individually to the mixing zone where the polyisocyanate and polyol(s) are contacted. It is also possible to prereact all or a portion of the polyol(s) with the polyisocyanate to form a prepolymer, although such is not preferred. For optimum processing, it is found convenient to prepare the polyurethane by mixing at a ambient temperature the reactants which themselves have a temperature of from about 10° C. to about 35° C., and preferably from about 15° C. to about 25° C.

The polyurethane foam obtained in accordance with this invention is of value for the appliance and construction industry where its attractive compressive strength, dimensional stability and thermal insulation is highly desirable. The invention may also be used to provide polyurethane foam for semirigid applications such as for example sealant foam applications.

SPECIFIC EMBODIMENTS OF THE INVENTION

The invention is illustrated by way of the examples given hereinbelow, which are not to be considered as limiting the scope of the invention. Unless otherwise indicated all amounts given are parts by weight.

EXAMPLE 1

The storage stability of various hydrocarbon / polyol mixtures optionally containing castor oil is reported in Table 1. The substances and relative amounts making up the hydrocarbon and polyol mixtures is also given in Table 1. The storage stability is determined in accordance with the following general procedure in which the hydrocarbon is blended into a polyol mixture, representative of a formulation typically used for the manufacture of rigid polyurethane foam, and the resulting blend allowed to stand at room temperature for 7 days. After this period, the stability of the resulting blend is visually rated according to the following scheme:

"Separates"- blend separates into multiple layers.

"Turbid"- the turbid blend does not separate into multiple layers and does not become clear on agitation.

"Limit"- the turbid blend does not separate into multiple layers and on agitation becomes clear.

"Clear"- the blend is clear and not separated into multiple layers.

Blends 1, 2 and 5 which separate are undesirable for the purposes of preparing a polyurethane foam; Blends 3 and 4 are observed to have a "clear" or "limit" status and are preferred as they are more readily manipulated in a consistent manner to the benefit of the foaming process.

TABLE 1

| parts by weight | Blend 1* | Blend 2* | Blend 3 | Blend 4 | Blend 5* |
|---|---|---|---|---|---|
| Castor Oil | 0 | 3 | 7 | 10 | 28.5 |
| Polyol 1 | 51 | 51 | 51 | 52.3 | 51 |
| Polyol 2 | 14.3 | 14.3 | 14.3 | 12 | 14.3 |
| Polyol 3 | 28.5 | 25.5 | 21.5 | 20 | 0 |
| Surfactant 1 | 2 | 2 | 2 | 1.5 | 2 |
| Catalyst | 2.2 | 2.2 | 2.2 | 2.2 | 2.2 |
| Water | 2 | 2 | 2 | 2 | 2 |
| i-pentane | 10 | 10 | 10 | 10 | 10 |
| n-pentane | 3 | 3 | 3 | 3 | 3 |
| Blend Stability after 7 days at: | | | | | |
| i) 20° C. | / | Turbid | limit | clear | Separates |
| ii) 5° C. | Separates | Separates | Turbid | limit | Separates |

*Not an example of this invention
Polyol 1: a sorbitol-initiated oxypropylene polyether polyol having a hydroxyl number of 480.
Polyol 2: an ethylenediamine-initiated oxypropylene polyether polyol having a hydroxyl number of 640.
Polyol 3: a glycerine-initiated oxypropylene polyether polyol having a hydroxyl number of 160.
Surfactant 1: TEGOSTAB B8462 a silicon-based surfactant from Th Goldschmidt AG
Catalyst: a blend of urethane promoting catalysts containing 1.2 pbw dimethylcyclohexylamine, 0.4 pbw pentamethyldiethylenetriamine: and 0.6 pbw of CURITHANE 206 a proprietary urethane promoting catalyst available from The Dow Chemical Company.

EXAMPLE 2

Rigid polyurethane foam is machine-prepared in the presence of a hydrocarbon blowing agent and castor oil using the formulation as given in Table 2. High pressure mixing conditions with reactants being introduced to the mixer head at a temperature of about 20° C. are used. The results indicate that an improved blend stability is obtained whilst still maintaining an acceptable overall foam physical performance.

TABLE 2

| parts by weight | Foam 1* | Foam 2 | Foam 3 |
|---|---|---|---|
| Castor Oil | 0 | 5 | 10 |
| Polyol 1 ① | 50 | 48 | 50.5 |
| Polyol 2 ① | 15 | 14 | 14 |
| Polyol 3 ① | 28.5 | 27 | 18.5 |
| Surfactant 1 ① | 2 | 1.5 | 1.5 |
| Catalyst ① | 2.2 | 2.2 | 2.2 |
| Water | 2.3 | 2.3 | 2.3 |
| i-pentane | 9.5 | 10 | 10 |
| n-pentane | 3 | 3 | 3 |
| Isocyanate ② Index | 115 | 115 | 115 |
| Blend Stability after 7 days at 5° C. | separates | limit | clear |
| Free Rise Density (kg/m³) | 22.6 | 21.7 | 22.4 |
| Molded Foam properties, Density (kg/m³) | 34.3 | 32.6 | 32.9 |
| Compressive Strength (kPa) (DIN 53421) | 154.9 | 119.6 | 137 |
| Thermal Conductivity (mW/M.k) (ASTM C-518) | 23.1 | 23.5 | 23.2 |
| Demold post expansion at 4 minutes (mm) | 3.9 | 5 | 4.3 |

*Not an example of this invention.
① As given for Example 1.
② VORATEC SD100, a polymeric methylene diphenylisocyanate with an NCO functionality of 2.7 available from The Dow Chemical Company.

What is claimed is:

1. A process for preparing a closed-celled polyurethane foam which comprises reacting, in the presence of a hydrocarbon blowing agent, a polyisocyanate with a polyol composition wherein the polyol composition comprises:
   i) a polyether or polyester polyol having a hydroxyl number value of from about 100 to about 1200; and
   ii) from about 5 to about 25 parts, per 100 parts by total weight of the polyol composition, of a fatty oil having a hydroxyl number of from about 100 to about 200.

2. The process of claim 1 wherein the hydrocarbon blowing agent comprises a $C_{4-8}$ aliphatic or cycloaliphatic hydrocarbon being an alkane, alkene or alkyne.

3. The process of claim 1 wherein the hydrocarbon blowing agent is butane, n-pentane, i-pentane, hexane, cyclopentane, methylcyclopentane, cyclohexane, methylcyclohexane, isomers thereof, or mixtures of two or more thereof.

4. The process of claim 1 wherein the fatty oil has a hydroxyl number of from about 130 to about 180.

5. The process of claim 4 wherein the fatty oil has a hydroxyl number of from about 140 to about 180.

6. The process of claim 1 wherein the fatty oil is present in an amount of from about 6 to about 18 parts.

7. The process of claim 6 wherein the fatty oil is present in an amount of from about 7 to about 15 parts.

8. The process of claim 1 wherein the fatty oil comprises a fatty acid.

9. The process of claim 8 wherein the fatty acid is ricinoleic acid, dihydroxystearic acid, palmitic acid stearic acid, oleic acid, linoleic acid, linolenic acid, eicosanoic acid, or mixtures of two or more thereof.

10. The process of claim 9 wherein the fatty acid is ricinoleic acid.

11. The process of claim 8 wherein the fatty oil is castor oil.

12. The process of claim 1 which further comprises water in an amount of from about 0,5 to about 10 parts per 100 parts by total weight of the polyol composition.

13. The process of claim 1 wherein the polyisocyanate is an aromatic polyisocyanate comprising methylene diphenylisocyanate or polymethylene polyphenylisocyanate.

14. The process of claim 13 wherein the aromatic polyisocyanate has an average isocyanate functionality of at least 2.3 and comprises, based on its total weight: from about 10 to about 50 wt % of methylene diphenylisocyanate; and from about 90 to about 50 wt % of polymethylene polyphenylisocyanate.

15. A process for preparing a closed-celled polyurethane foam having a density of from about 10 to about 50 kg/m³ by reacting, in the presence of a hydrocarbon blowing agent, a polyisocyanate with a polyol composition wherein the polyol composition comprises:
   i) a polyol composition containing a polyether polyol having a hydroxyl number value of from about 100 to about 1200, and including from about 7 to about 15 parts, per 100 parts by total weight of the polyol composition, of a fatty oil being castor oil; in the presence of
   ii) from about 2 to about 6 parts of water per 100 parts by weight of polyol composition; and
   iii) a hydrocarbon blowing agent being n-pentane, i-pentane, hexane, cyclopentane, methylcyclopentane, cyclohexane, methylcyclohexane or mixtures thereof, and
wherein the polyisocyanate is present in an amount to provide for an isocyanate reaction index of from about 60 to about 300.

* * * * *